United States Patent
Freund et al.

[11] Patent Number: 5,923,833
[45] Date of Patent: Jul. 13, 1999

[54] RESTART AND RECOVERY OF OMG-COMPLIANT TRANSACTION SYSTEMS

[75] Inventors: Thomas Freund; Simon Holdsworth, both of Hants; Iain Houston, Dorset; Robert Anthony Storey, Hants, all of United Kingdom

[73] Assignee: International Business Machines Coporation, Armonk, N.Y.

[21] Appl. No.: 08/818,482

[22] Filed: Mar. 14, 1997

[30] Foreign Application Priority Data

Mar. 19, 1996 [GB] United Kingdom .................... 9605761

[51] Int. Cl.⁶ ...................................................... G06F 11/00
[52] U.S. Cl. ................................ 395/182.17; 395/182.18; 707/202
[58] Field of Search ........................ 395/182.17, 182.16, 395/182.18, 182.13, 182.14, 182.15; 707/202

[56] References Cited

U.S. PATENT DOCUMENTS

| | | | |
|---|---|---|---|
| 4,868,744 | 9/1989 | Reinsch et al. ..................... | 395/182.17 |
| 5,140,689 | 8/1992 | Kobayashi .......................... | 395/182.18 |
| 5,151,987 | 9/1992 | Abraham et al. ...................... | 395/575 |
| 5,313,629 | 5/1994 | Abraham et al. ...................... | 707/202 |
| 5,452,445 | 9/1995 | Hallmark et al. ............................ | 707/2 |
| 5,680,610 | 10/1997 | Smith et al. ............................ | 707/202 |
| 5,712,971 | 1/1998 | Stanfill et al. ...................... | 395/182.13 |
| 5,734,896 | 3/1998 | Rizvi et al. ............................. | 707/202 |
| 5,745,674 | 4/1998 | Lupton et al. ...................... | 395/182.18 |

*Primary Examiner*—Joseph E. Palys
*Assistant Examiner*—Scott T. Baderman
*Attorney, Agent, or Firm*—Jeffrey S. LaBaw

[57] ABSTRACT

A method and system for implementing a Restart Service for the Object Transaction Service are described. The present invention provides a method and system which trigger restart of an OTS instance upon system recovery or upon system failure. The Restart Service runs independently of the client or server processes which it restarts. When a client or server enters a pending state for a transaction, a permanent record containing information to allow the OTS instance to be restarted is stored in a Restart Repository. In the event of system recovery being needed, or of a system failure, a Restart Daemon reads information from the Restart Repository and recreates the process context. The Recovery Service is initialized and log data replayed to a Transaction Manager to determine the outcome of pending transactions. Failed objects and instances of the OTS are restarted.

13 Claims, 5 Drawing Sheets

PRIOR ART

RESTART AND RECOVERY OF OMG-COMPLIANT TRANSACTION SYSTEMS

FIELD OF THE INVENTION

The present invention relates to the field of data processing, more specifically to transaction processing systems, and in particular to object oriented distributed transaction processing systems incorporating restart and recovery.

BACKGROUND ART

Computer implemented transaction processing systems are used for critical business tasks in a number of industries. A transaction defines a single unit of work that must either be fully completed or fully purged without action. For example, in the case of a bank automated teller machine (ATM) from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and actual occurrences.

Distributed transaction processing involves a transaction that affects resources at more than one physical or logical location. In the above example, an ATM transaction affects resources managed at the local ATM device as well as bank balances managed by a bank's main computer. A distributed transaction may not be physically distributed but may involve cooperating tasks that must be completed in synchrony for successful transaction completion.

The X/Open Company Limited (X/Open is a trademark of X/Open Company Ltd.) has promulgated a guide that describes one model for implementing distributed transaction processing. The X/Open Guide, Distributed Transaction Processing Reference Model, November 1993, ISBN 1-85912-819-9, discusses the components of a distributed transaction system and the interrelationships between them. The X/Open Distributed Transaction Processing Model (the DTP Model) describes three main components: an Application Program (AP), a Transaction Manager (TM), and one or more Resource Managers (RMs). The Application Program uses and modifies the resources controlled by one or more of the Resource Managers. The Transaction Manager is responsible for global transactions and coordinates the decision whether to commit or roll-back the actions taken by the Resource Managers. (Commit causes the resources to be updated while roll-back causes all work to be discarded returning the resources to the state they were in upon transaction initiation.) The Resource Managers manage specific resources. Resource Managers may include a database management system (DBMS), a file system, or similar resource.

Object oriented programming systems are designed to increase the efficiency of program development by enabling object reuse and simplifying system maintenance through clear separation of function. Each object in an object oriented system encapsulates the data for that object and the procedures or methods for operating on that data. Encapsulation means that the data for an object can be manipulated only by that object using the defined methods.

Object oriented systems also implement object inheritance. Inheritance allows a more specific object to be derived from a general object. The more specific object can "inherit" all of the data and methods of the parent object. It can override selected data and methods and add others to implement its unique function.

One such object oriented system is System Object Model (SOM) from IBM Corporation. In SOM, all applications using objects run in a single address space in which the objects are also located. A development within SOM is a framework of object classes called Distributed System Object Model (DSOM). In DSOM, applications (running in clients) in one address space may access objects in another address space (such as an address space belonging to a server). These address spaces may be in the same or different systems. In fact, the systems need not be running the same platform. For example, a client application running in an address space on an OS/2 system may access an object that is located in an address space on an AIX/6000 system, or vice versa. Both SOM and DSOM are described in "SOMobjects: A Practical Introduction to SOM and DSOM", published by IBM Corporation, Copyright 1994, Order no. GG24-4357-00. (SOM, OS/2, AIX and SOMobjects are trademarks of IBM Corporation).

The application of object oriented techniques to transaction processing systems raises many new issues but offers opportunities to increase system efficiency through the use of object oriented principles. The Object Management Group, Inc. (OMG) has established standards for interoperable object oriented systems. The overall architecture defined by OMG is the Object Management Architecture (OMA). A central component of OMA is the Object Request Broker that enables objects to send messages to other objects. The Common Object Request Broker Architecture (CORBA) defines the interactions between objects, and in particular, between distributed objects in different computer systems. The Object Request Broker (ORB) provides location transparency and hides the details of communication between objects. CORBA is specified in the OMG publication entitled, The Common Object Request Broker: Architecture and Specification, March 1992.

OMG has accepted a specification to standardise transaction processing in object oriented systems. This specification, entitled the Object Transaction Service (OTS) Specification, OMG document 94.8.4, sets forth the requirements for object services necessary to implement a transaction processing system. The OTS comprises a set of standard interfaces which object oriented applications may use to achieve recoverable behaviour. It also comprises a set of standard interfaces with the ORB to allow propagation of transaction context between ORB processes and to allow recovery of OTS state at server startup. The OTS specification uses many of the unique capabilities of object oriented systems. The OTS model, however, is designed to be interoperable with the X/Open DTP model and with existing procedural transaction processing systems.

The X/Open DTP model describes and many commercial transaction processing systems use what is termed a "two phase commit" to decide whether or not to commit the changes made by a transaction. The first phase involves the transaction manager determining whether each of the resource managers believes it is able to successfully commit the changes made by the transaction. If any resource manager indicates that it cannot, or fails to respond, the transaction manager causes the changes to be rolled back in each resource manager. If all of the responses are positive, then the transaction manager orders all of the resource managers to commit the transaction.

A Restart Service is a service which provides facilities to restart entities after a failure. The entities restarted and the definition of a failure of those entities varies from one service to another. A Restart Service typically has no knowledge of the state of the entities.

A Recovery Service provides facilities for the specific state of an entity to be reconstructed at a specific time. A Recovery Service typically has no way to trigger its restart after a failure. Within OTS, the Recovery Service keeps a record of the changes made to the state of recoverable objects. That record of changes is used to undo updates made in the event of a transaction rollback or to redo updates in the event of a transaction being committed. The Recovery Service also stores the global identifier for the transaction and the identities of all of the participants in a transaction. The Recovery Service stores this information persistently, with the state data being written to persistent storage at times specified by the OTS.

After a failure, when a DSOM server process is restarted, OTS is called by means of a "hook" into the DSOM startup code. OTS uses the Recovery Service to read back information about all transactions which were in-doubt prior to the failure. This information is then used to reconstruct the internal state of objects to allow the in-doubt transactions to be resolved by either being committed or by being rolled back. Starting the DSOM server process causes an instance of OTS to be created in each DSOM server process.

U.S. Pat. No. 5,151,987 discloses a method of recovering from unplanned failures in object oriented computing environments by storing recovery information in recovery objects. During recovery operations, methods present in that instance of an object use the recovery information to identify committable actions which were executed prior to the unplanned failure.

A problem with prior art recovery methods is that they do not define a general OMG system service to trigger execution of a pre-defined set of requests at startup or after a failure. The failures include hardware failures and server process failures. The pre-defined set of requests includes a defined startup/restart set of requests.

Another problem with prior art recovery methods is how to define a "specific" mechanism within the OMG/OTS that allows restart of failed processes to enable recovery to occur in a timely manner after failure. This recovery includes reconstruction of the execution state of objects associated with outstanding transactional work.

SUMMARY OF THE INVENTION

Accordingly the invention provides a method for restart and recovery of an OMG-compliant transaction system comprising the steps of: providing a client process having a unique identifier; executing a transaction, by said client process, said execution including the invocation of requests on processes running in a remote system; logging, with a recovery service, of recovery information for the client process in a log file; and committing of the transaction, resulting in the transaction going into a "prepared" state.

The invention is characterised in that the method further comprises the steps of: monitoring, by a restart process, said client process and providing an indication if said client process fails; after said transaction goes into a "prepared" state, registering with a Restart Service by the addition of restart information to a Restart Repository; and wherein, in response to said indication that said client process has failed, after said transaction goes into a "prepared" state, but before said transaction goes into a "committed" state, the method further comprises the steps of: recreation, by said restart process, of the process context associated with said client process; recreation of said Recovery Service, associated with said client process; determination of the outcome of any in-doubt transactions using data from said log file; for each of said in-doubt transactions having their outcome determined, executing commit or rollback operations on the participants corresponding to the outcome of the transactions.

The invention also provides a distributed OMG-compliant transaction system comprising a client process having a unique identifier; means for executing a transaction, including means for invocation of requests on processes running in a system remote from the client, means for committing said transaction, causing said transaction to go into a "prepared" state; a Recovery Service, associated with said client process, for logging of recovery information in a log file.

The invention is characterised in that the system further comprises: a restart repository for the storage of restart information associated with the transaction; wherein said means for executing a transaction further includes means for storing in said restart repository, restart information associated with the transaction, said restart information being stored after said transaction goes into a "prepared" state; a restart process including means for monitoring said client process and providing an indication if said client fails, means, responsive to said monitoring means, for recreating the process context associated with said client process, means, responsive to said monitoring means, for recreating said Recovery Service associated with said client process, means for determining the outcome of any in-doubt transactions using data from said log file and means for executing commit or rollback operations on the participants in each of said in-doubt transactions having their outcome determined, corresponding to the outcome of the transactions.

BRIEF DESCRIPTION OF THE DRAWINGS

An embodiment of the invention will now be described, by way of example, with reference to the accompanying drawings, in which.

DETAILED DESCRIPTION OF THE PREFERRED EMBODIMENT

Figure 1:
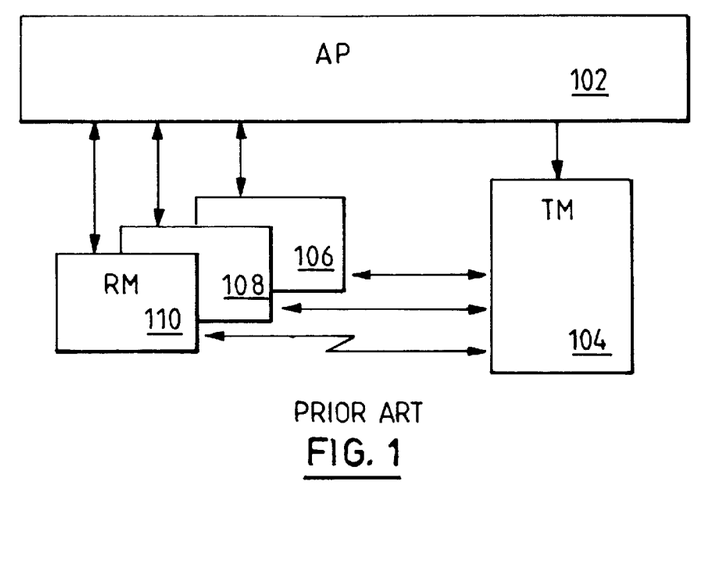
FIG. 1 is a block diagram illustrating the prior art X/Open Distributed Transaction Processing model.

The X/Open Distributed Transaction Processing (DTP) model is shown generally in FIG. 1. An Application Program (AP) 102 executes and causes data or other resources to change state. Resources are managed by Resource Managers (RM) 106, 108, 110, each of which can be a database management system (DBMS), file management system, communication Resource Managers (such as CPI-C, TxRPC, XATMI) or a similar system. The Resource Managers 106, 108, 110 may be distributed on computer systems remote from the system executing the Application Program 102 or they may be implemented as separate processes within the same computer system. Transaction Manager 104 controls the completion of processing for each particular transaction initiated by Application Program 102. Transaction Manager 104 coordinates the actions of the Resource Managers 106, 108, 110 to ensure that all resources are in a consistent state at the end of the transaction. This coordination ensures that the transaction appears to operate atomically, i.e. the transaction either changes all resources associated with the transaction or it changes none of them.

Figure 2:
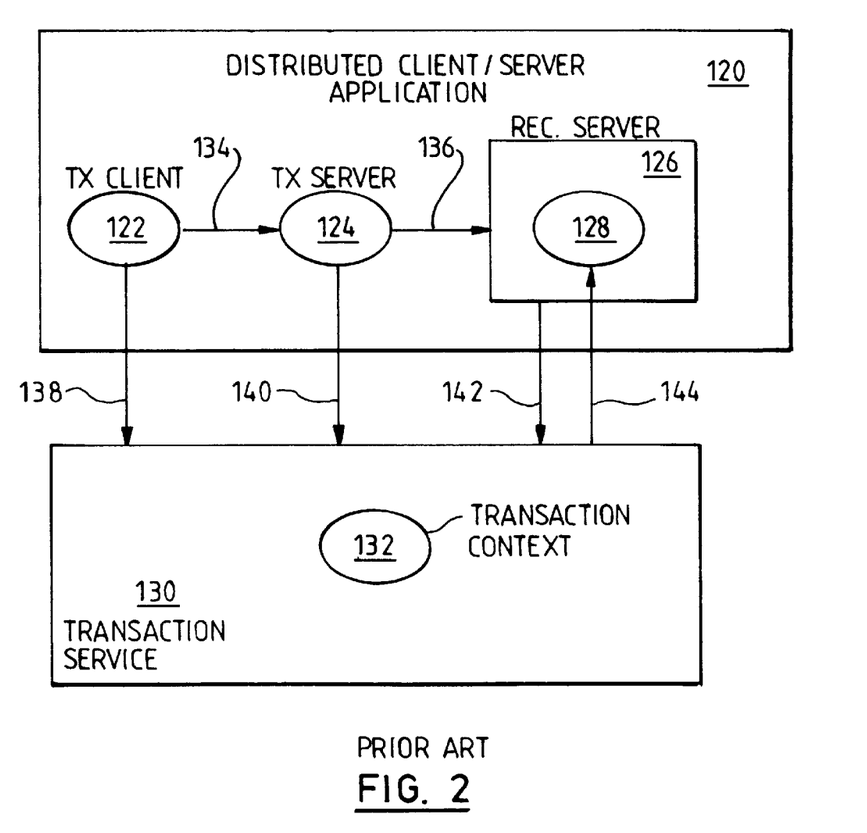
FIG. 2 is a block diagram illustrating the prior art OMG Object Transaction Services model.

The Object Transaction Services (OTS) model defined by the Object Management Group (OMG) is shown generally in FIG. 2. A distributed client/server (C/S) application is shown at 120. The application 120 comprises a number of objects that exchange messages to accomplish the actions required by the transaction. The objects present in the application 120 include one or more Transactional Clients 122 that invoke operations on transactional objects within a single transaction. The object that begins a transaction is the transaction originator. The originator sends a message 138 to the Transaction Services 130 at the beginning and end of a transaction.

Transaction Services 130 provides operations and protocols to control the scope and duration of a transaction and to allow multiple objects to be involved in a single transaction where either all of the objects commit the changes made by the transaction or all of the objects roll back the changes made by the transaction. Operations are also provided to allow objects to associate changes in their internal state data with a transaction and to coordinate the completion of the transaction.

A transactional object is an object whose behaviour is affected by being invoked within the scope of a transaction. A transactional object typically contains or refers to persistent data that can be modified by transactional requests. Persistent data is that data that will survive a system restart. Persistent data typically resides on disk storage devices, non-volatile memory or similar devices.

Transactional objects are used to implement two types of application servers: a transactional server 124 and a recoverable server 126.

A recoverable server 126 is a collection of objects, at least one of which is recoverable. A recoverable server 126 participates in the protocols by registering one or more Resource objects 128 with the Transaction Service 130 using a Registration message 142. The Transaction Service 130 drives the commit protocol by issuing requests 144 to the resource objects 128 registered for a transaction. A recoverable server 126 implements protocols necessary to respond to a transactional server 124 and ensure that all participants in the transaction agree on the outcome, either to commit the transaction or roll-back the transaction, and to be able to recover from failure. A recoverable object is a transactional object, but not all transactional objects are recoverable. Non-recoverable transactional objects may implement their state data using some other recoverable object.

A recoverable object must participate in Transaction Service 130 protocols. Transaction Services 130 maintains certain data defining the scope of each transaction as transaction context 132. This data is not directly relevant to the present invention, but includes the Control object reference for the transaction, which contains the Coordinator and Terminator reference. The Coordinator reference refers to a Coordinator object, which supports operations needed by resources to participate in a transaction. The terminator reference refers to a Terminator object, which supports operations to end a transaction. A transaction context 132 is associated with each thread. The transaction context 132 is submitted with each request generated from the transactional client 122 and is used to define operational environment characteristics where the request is processed. Contents of the transaction context 132 can include a reference to the transaction coordinator, ancestor references for nested transactions, a globally unique transaction id for the transaction coordinator and implementation specific data understood by the subordinate transaction coordinator.

Recoverable objects participate in Transaction Services 130 by registering 142 a Resource 128 with the Transaction Service 130. The Transaction Service 130 drives the commit protocol (the two phase commit) by contacting those resources registered for a transaction.

A transactional server 124 is a collection of one or more objects whose behaviour is affected by the transaction but which have no recoverable state data of their own. A transactional server 124 implements transactional changes using other recoverable objects. A transactional server 124 does not participate in the completion of the transaction but can force the transaction to be rolled back by sending a roll back message 140.

Figure 3:
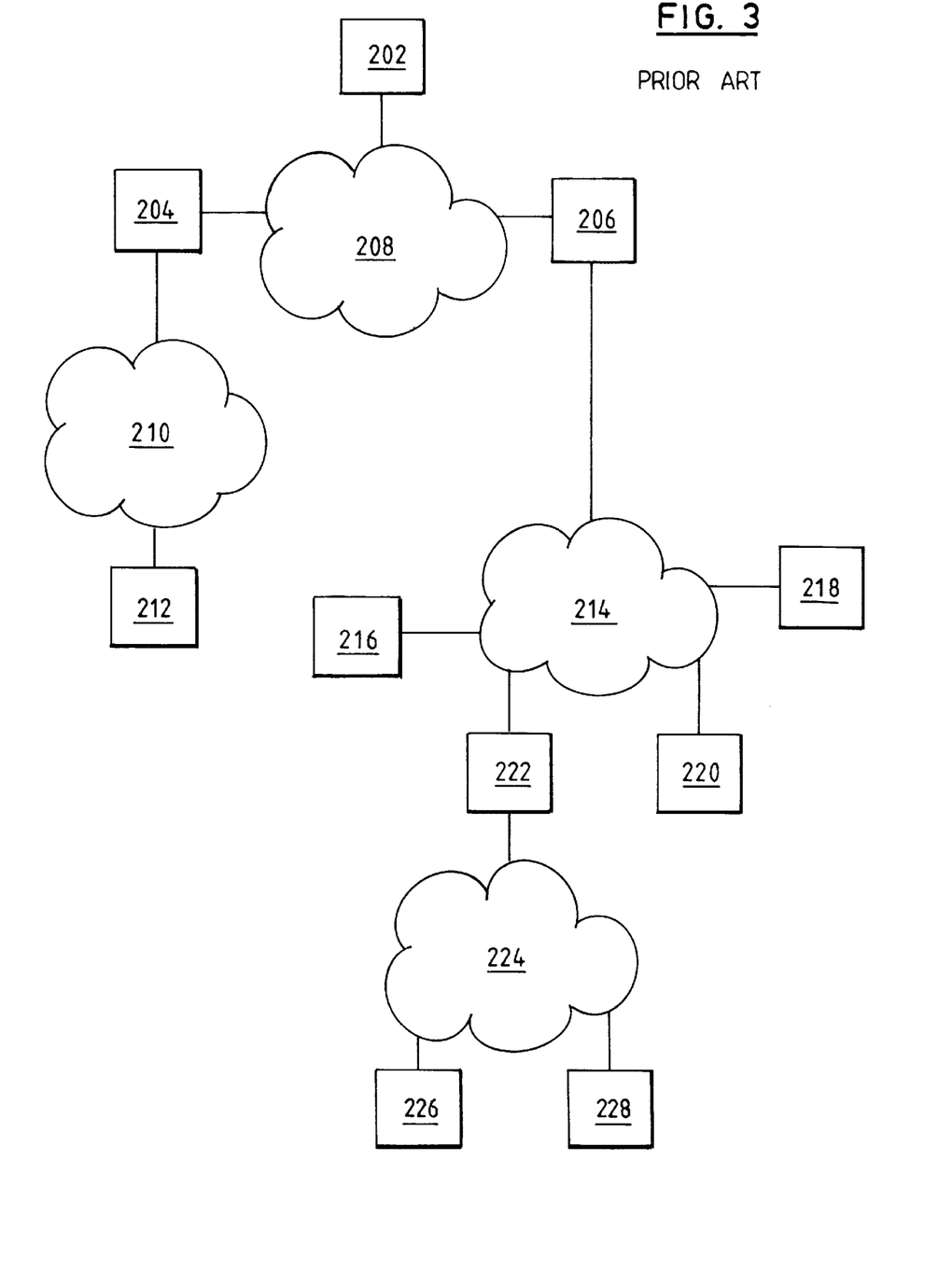
FIG. 3 is a block diagram illustrating a prior art system of distributed computers interconnected by networks in which the preferred embodiment of the present invention is applied.

An example of a distributed processing system in which the present invention is implemented is shown generally in FIG. 3. Several computer systems are interconnecting using communication networks. For example, systems 212 and 204 are connected by network 210. Systems 204, 202, and 206 by network 208. Systems 206, 216, 218, 220, and 222 by network 214 and systems 222, 226, and 228 by network 224. The networks can be any known local area network (LAN) or wide area network (WAN), including token ring, Ethernet or other network. The "network" can also be the communication bus between multiple processes in a single computer system.

Figure 4:
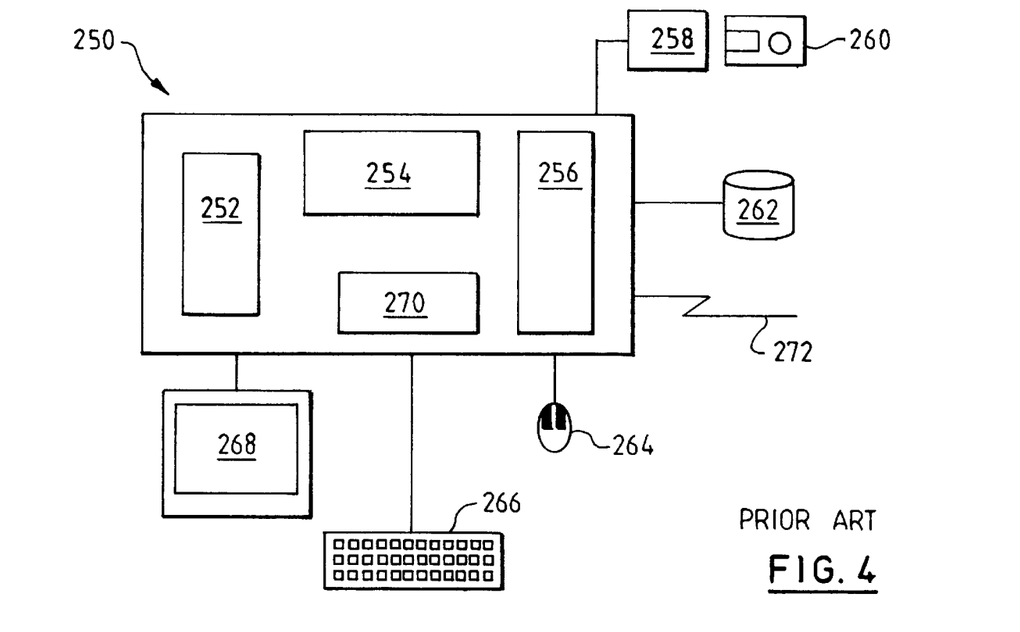
FIG. 4 is a block diagram of a prior art computer system used in order to implement the present invention.

FIG. 4 shows a typical computer system such as those represented in FIG. 3 by the numerals 202, 204 and others. Each system 250 contains one or more central processing units 252, volatile memory 254, and input/output controller 256. The input/output controller 256 manages writing to magnetic or optical disk storage 262, removable storage 258, 260 and to display 268, keyboard 266 and pointing device 264. System communication controller 270 manages communications with a network via communication link 272. This configuration is provided for exemplary purposes only and is not intended to be limiting. A commercially available computer system such as the IBM PS/2 computer or IBM RISC System/6000 workstation are examples of the types of systems on which the invention may be practised. (PS/2 and RISC System/6000 are trademarks of the IBM Corporation.) As discussed above, the systems of a distributed environment may all be linked via a single communications bus sharing memory and disk storage.

Computer system 250 is controlled by an operating system such as the OS/2 operating system, or the AIX operating system (OS/2 and AIX are trademarks of the IBM Corporation.) Network communications may be managed by a network operating system such as Novell Netware operating system, or the IBM LAN Server operating system.

The present invention is practised using a program or suitable hardware to control a computer system such as those described above.

An object oriented application (120 in FIG. 2) performs transaction operations using the objects and classes defined by the OMG Object Transaction Services model. These classes provide an object oriented interface or API into the OMG OTS. The present invention solves the problem of defining a general OMG system service to trigger execution of a pre-defined set of requests at startup or after a failure. The failures include hardware failures and server process failures. The pre-defined set of requests includes a defined startup/restart set of requests. The present invention also solves the problem of defining a "specific" mechanism within the OMG/OTS that allows restart of failed processes to enable recovery to occur in a timely manner after failure. This recovery includes reconstruction of the execution state of objects associated with outstanding transactional work.

Figure 5:
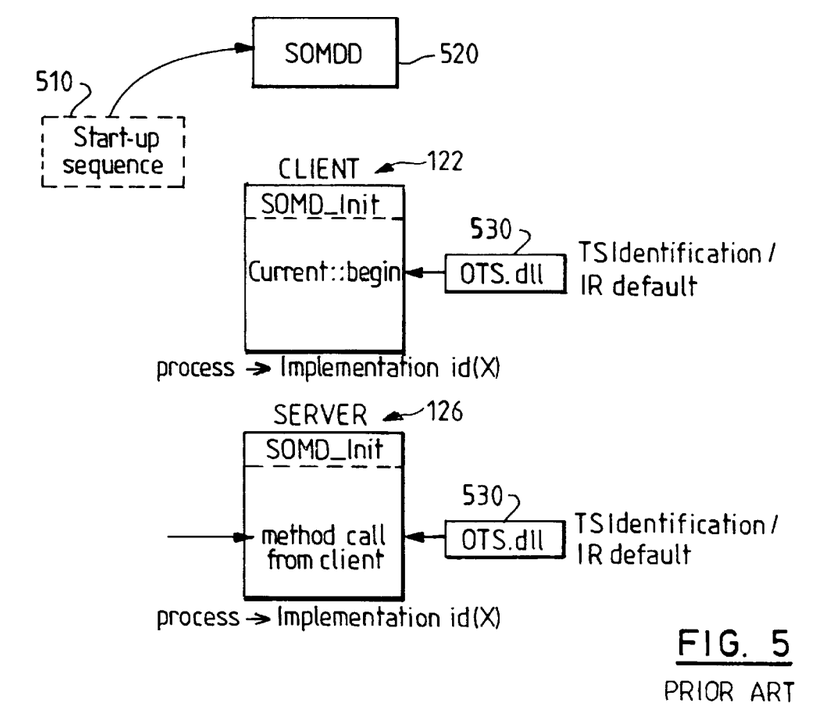
FIG. 5 shows the processes involved in a prior art distributed object transaction.

The Object Transaction Services (OTS) model allows for the OTS to be run as a procedure call from within the same process context as the client or the server process which is making the procedure call. FIG. 5 shows three processes. The DSOM daemon process 520, running SOMDD.EXE must be running before the client 122 or server 124, 126 processes are started. Typically, this is achieved by means of starting the daemon process from the OS/2 startup sequence 510 (STARTUP.CMD). The client process 122 is started manually, typically by the end user typing a command or clicking on an icon which represents the application. The server process 126 may already be running, or if a request is made of the server process 124, 126, then the daemon process 520 will start the server process 124, 126 automatically.

Each process, such as the client process 122 and the server processes 124, 126 are identified by a unique implementation id. This is specified when the process is configured. This is used as a key into an Implementation Repository which further defines the execution context for the process. An Implementation Repository is a database which contains information regarding DSOM servers. A client application uses the Implementation Repository to locate a DSOM server having the method it wishes to invoke. In the present embodiment, all client applications have a server alias since this can be used as a persistent identifier to allow location of log file records associated with this process. However, other means of providing this persistent identifier may be used without departing from the spirit of the present invention.

The TSIdentification interface is a standard interface which a Transaction Service uses to identify itself to an ORB for the purposes of propagating transaction context between processes. This allows the ORB to support alternative implementations of the OTS.

The DSOM implementation of the TSIdentification interface allows a Transaction Service to identify itself prior to the completion of the DSOM server initialisation. At this point, if no service has used the TSIdentification interface, and the OTS 530 is installed, then the ORB uses a default object that supports the relevant interfaces. This default object, when created by the ORB, uses the Recovery service to identify whether recovery is required for this process. Because the object is created at the end of DSOM server initialisation, the DSOM server id is known, and is used by the Recovery Service to locate transaction information from a previous execution of the same server. If there is such information, the OTS 530 is initialised, and uses the TSIdentification interface. The first time any subsequent transactional activity occurs in the process, the default object allows itself to be replaced by the "real" transaction service. The creation of this default object is the "hook" referred to earlier.

Figure 6:
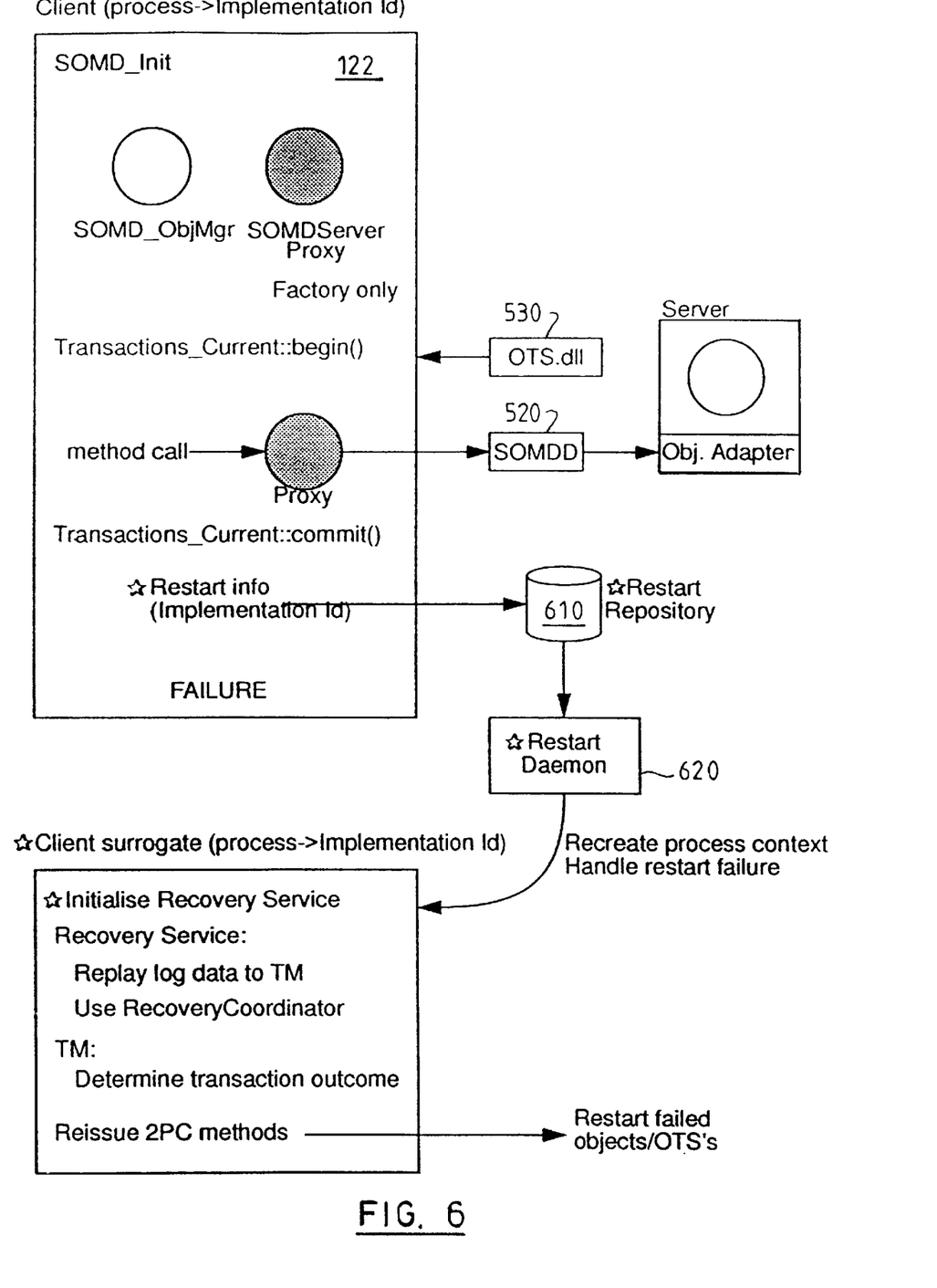
FIG. 6 shows normal execution of a client, followed by failure and restart according to the present invention.

FIG. 6 shows the normal execution of a client 122, followed by failure of the client and then restart of the client.

Shown in FIG. 6 is a client process 122. This process has an Implementation Id of (X). The client process must call SOMD_Init to initialise the DSOM state data in the process. The end of this initialisation is the earliest time in the execution of the process at which the Implementation ID is known.

In a first embodiment, the "Current" interface is used by the client application to begin and end transactions. The "Current" interface is described in detail on pages 21 and 22 of the "Object Transaction Services" document mentioned earlier. Briefly its purpose is to define operations that allow a client of the Transaction Service to manage the association between threads and transactions and to simplify the use of the Transaction Service. The use of Current::begin is typically the first transactional operation in a client. This will cause the "begin" method of the object "Current" to be invoked. This will trigger initialisation of the OTS whenever there is no Recovery state data for the process.

In a second embodiment, the "TransactionFactory" interface is used by the client application to begin and end transactions. The "TransactionFactory" interface is described in detail on pages 25 of the "Object Transaction Services" document mentioned earlier. Briefly its purpose is to allow a transaction originator to begin a transaction. A Control object is returned, which can be used to manage or control participation in the new transaction. If the "TransactionFactory" object is local to the client, the effect is the same as using the "Current" interface. If the "TransactionFactory" object is in fact a proxy to an object in a remote server process, then initialisation of the OTS is not done in the client, but in the server. OTS may be subsequently initialised in the client if the client subsequently uses the Current interface.

A transaction is created either by calling the Current interface or the TransactionFactory interface, both being located in the Transactions module of the OTS. The internal state data of the OTS is modified so that the client thread is associated with the new transaction. If the client thread is presently associated with a transaction, the new transaction being created is made a subtransaction of that transaction. Otherwise, the new transaction is a top-level transaction. If the client thread already has an associated transaction and the Transaction Service implementation does not support nested transactions, a SubtransactionsUnavailable exception is raised.

At some point during the execution of the transaction, the client may invoke a request on a remote object. The invocation of this request results in an object registered via the TSIdentification interface being invoked first in order to supply transaction context to the remote process.

At a later point in the transaction, the client may initiate commitment of the transaction. This results in the transaction going into a prepared state. Once in this state, the transaction must be resolved regardless of failures to the client. The Current interface located in the Transactions module is called and the commit method of the Current interface is invoked to complete the transaction associated with the client thread. The client thread transaction context is modified as follows: If the transaction was begun by a thread (invoking the begin method of the Current interface) in the same execution environment, then the thread's transaction context is restored to its state prior to the begin request. Otherwise the thread's transaction context is set to null.

The prior art Object Transaction Service described above does not have provision for the Implementation ID of the process to be available after a failure. The Implementation ID is used to identify the server and the state data in the Recovery Service that was stored during the previous execution of that server. This allows subsequent executions of the server to identify the location of the recovery information previously stored. It is necessary to have provision for the Implementation ID of the process to be available after a failure because the DSOM framework of classes requires that objects must be reconstructed in the process context in which they were originally created. Systems other than DSOM may allow any new process to obtain the recovery information and perform recovery.

In the method and system of the present invention, during commitment of the transaction, the client registers with a Restart Repository 610, which stores the name of the client, together with its Implementation ID and other information.

Figure 7:
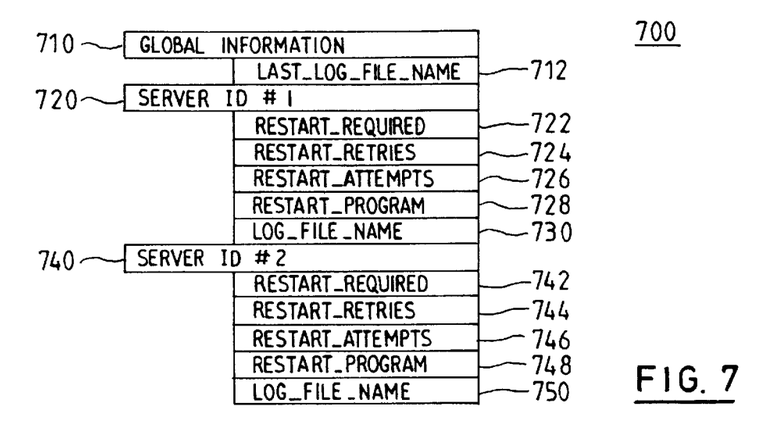
FIG. 7 shows a restart repository used in the restart process shown in FIG. 6.

FIG. 7 shows a Restart Repository 700 according to the present invention. In an exemplary embodiment in which the restart repository 700 contains information placed in it by two servers, the restart repository 700 has the following information in it:

| Data | Reference numeral |
|---|---|
| GLOBAL INFORMATION | 710 |
| LAST_LOG_FILE_NAME | 712 |
| SERVER ID#1 | 720 |
| RESTART_REQUIRED: <Y/N> : | 722 |
| RESTART_RETRIES: <number> : | 724 |
| RESTART_ATTEMPTS: <number> : | 726 |
| RESTART_PROGRAM: <program name> : | 728 |
| LOG_FILE_NAME: <file name> : | 730 |
| SERVER ID#2 | 740 |
| RESTART_REQUIRED: <Y/N> : | 742 |
| RESTART_RETRIES: <number> : | 744 |
| RESTART_ATTEMPTS: <number> : | 746 |
| RESTART_PROGRAM: <program name> : | 748 |
| LOG_FILE_NAME: <file name> : | 750 |

GLOBAL INFORMATION—This identifies the information which follows as global information, rather than information related to a particular server. In the exemplary embodiment, there is only a single piece of global information detailed.

The LAST_LOG_FILE_NAME specifies the name of the last log file name used for the log file for a server. This is used to enable new log file names to be generated for additional servers without the names being duplicated.

The SERVER ID#1 value is the implementation id of the server placing the information in the restart repository. This value is then followed by the information relating to this server.

The RESTART_REQUIRED value indicates whether this server needs to be restarted. This is set and cleared by the Transaction Service.

The RESTART_RETRIES value is configured by an administrator to indicate the number of times the Restart Service should attempt to restart the server if required. If this value is zero, no restart is attempted, regardless of the setting of RESTART_REQUIRED.

The RESTART_ATTEMPTS counts the number of times the Restart Service has attempted to restart the process. If this value is greater than or equal to the RESTART_RETRIES, restart is not attempted regardless of the setting of RESTART_REQUIRED.

The RESTART_PROGRAM specifies the name of an alternate program to be executed for restart. This allows the specification of a client surrogate. If this is not specified, then the server is started using the program as defined in the DSOM Implementation Repository.

The LOG_FILE_NAME specifies the name of the file in which the Recovery Service information for this process is stored.

The information described above from SERVER ID# to LOG_FILE_NAME is then repeated for the second server ID in the exemplary embodiment. The invention is not limited to a single or to two servers, but may be expanded to as many servers as necessary.

Returning now to FIG. 6, if the client continues to function until completion of the commit phase, the data stored in the Restart Repository is not used as no recovery is necessary. If the client fails prior to the completion of the commit phase, then the data which was stored in the Restart Repository in used in the present invention to ensure correct system recovery.

Figure 8:
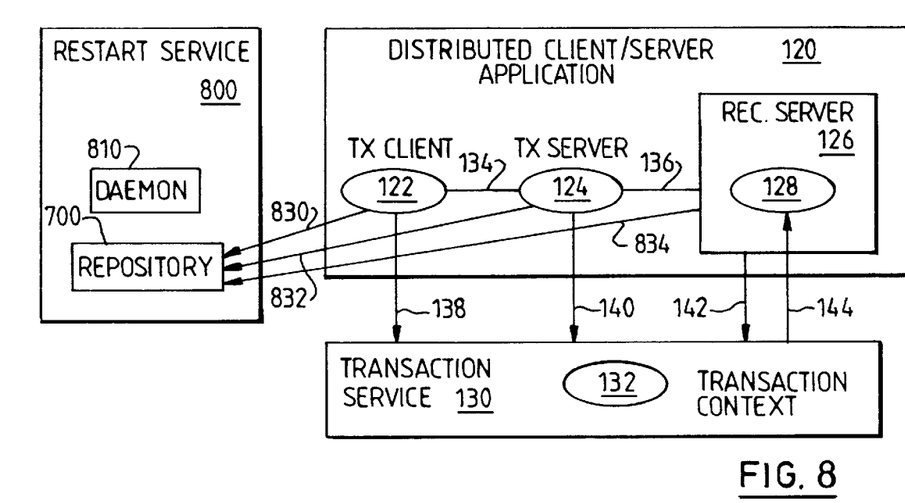
FIG. 8 shows a block diagram illustrating the present invention used with the OMG Object Transaction Services model.

FIG. 8 shows the relationship of the Restart Service 800 having a Restart daemon (described below) and a Restart Repository 700 (described above) with the various components of a prior art system using the OTS. Transactional client 122 has written 830 restart information into the Restart Repository 700 (as described above with reference to FIG. 6). Transactional server 124 and recoverable server 126 have also written 832, 834 restart information into the Restart Repository 700.

A Restart daemon 810, which runs as an independent process, is used to identify whether a client is operating satisfactorily. The Restart daemon is a process, which may be started manually, or as a statement in the STARTUP.CMD initialisation program of the system in which it is running. The Restart daemon 810 identifies whether the client is operating satisfactorily by using a heartbeat or periodic check of the entries in the Restart Repository. If any entry in the Restart Repository satisfies the requirements given above (i.e. that Restart is required and that the number of retries indicates that restart should be tried), then the daemon attempts restart of the failed process.

In order to restart the failed process, the restart daemon carries out the following steps:

1. The data stored in the Restart Repository is read. The value of RESTART_REQUIRED is checked and if this is "N", then no restart is required and the daemon process does not restart this server. If the value is "Y", then the value of RESTART_RETRIES is checked. If this is zero, then restart is not attempted. The value of RESTART_ATTEMPTS is checked. If this value is greater than or equal to the RESTART_RETRIES value, then restart is not attempted. Otherwise restart is attempted.

2. The process context of the failed process is recreated. This includes the implementation id of the failed process.

3. If the RESTART_PROGRAM entry has a value, then the daemon process starts the named program with any parameters specified, in the process. If the RESTART_PROGRAM is not specified, then the daemon process starts the DSOM server with the corresponding implementation ID in the process. This is done by requesting that DSOM start the server in the usual manner.

4. The program in the restarted process (client surrogate or DSOM server program) then initialises the Recovery Service. The initialisation of the Recovery Service will happen automatically during SOMOA::impl_is_ready, which the client surrogate must call in order to be a DSOM server.

5. The prior art Recovery Service replays log data from the LOG_FILE_NAME, which is the log file for this process, stored in the Restart Repository. In the prior art, the log file name has to be supplied by the process initiating the Recovery Service. The Recovery Service reconstructs the objects state data from this information. The OTS will contact all participants during recovery, except in the situation where a participant has registered but the process failed before the transaction became in-doubt. In that situation, the RecoveryCoordinator must be used because the OTS will not deliver the outcome (which will always be rollback in this case) as it has lost the participant list.

6. If the process which failed was a server, then the OTS need to invoke the RecoveryCoordinator::replay_completion operation on its superior in order to obtain a global outcome, and also to inform the superior that the transaction is in-doubt. Details of this operation can be found on pages 31 and 32 of the Object Transaction Service document mentioned above. The RecoveryCoordinator interface is for participants in a transaction to use if they believe that a transaction is in-doubt.

7. The Recovery Service replays the log data that corresponds to all of the in-doubt transactions. Log data regarding transactions that were active, but not in-doubt or have completed is discarded as no recovery is needed for these transactions. When the Recovery Service has completed replaying the log data, the Transaction Manager (TM) 104 determines the transaction outcome in a conventional manner.

At this point the outcome of each of the transactions, that is whether they should be committed or rolled back has been determined. What is necessary now is to perform the operations on the local resources or on the remote OTSs in order to reflect the outcome of each of the transactions.

The OTS in the restarted process re-issues the two phase commit protocols to complete the transaction. This is illustrated in FIG. 9.

Figure 9:
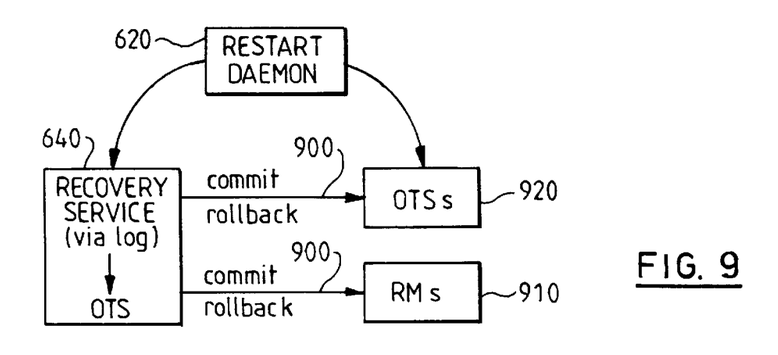
FIG. 9 shows the actions taken during recovery according to the present invention in a client or server.

FIG. 9 shows the actions taken during recovery of a restarted process. The Recovery Service 640 in the restarted process is shown. The restarted process may be either the client surrogate or the restarted DSOM server. The Recovery Service 640 is restarted in the process by the restart daemon 620 as described earlier. The Recovery Service 640 replays log information to the OTS.

The OTS re-issues commit or rollback indications 900 to the participants in the transaction, which may be local or remote resource managers 910, or remote OTS's 920. These re-issued requests 900 will result in any remote processes being restarted by DSOM if required; additionally those processes may also have been restarted by the restart daemon if this happened first. The restart daemon will not have restarted Resource Managers, only instances of the OTS in remote processes.

What is claimed is:

1. A method for restart and recovery of an OMG-compliant transaction system comprising the steps of:

providing a client process having a unique identifier;

executing a transaction, by said client process, said execution including the invocation of requests on processes running in a remote system;

logging, with a Recovery Service, of recovery information for the client process in a log file; and committing of the transaction, resulting in the transaction going into a "prepared" state; characterised in that, the method further comprises the steps of:

monitoring, by a restart process, said client process and providing an indication if said client process fails;

after said transaction goes into a "prepared" state, registering by said client process with a Restart Service by the addition of restart information to a Restart Repository; and wherein, in response to said indication that said client process has failed, after said transaction goes into a "prepared" state, but before said transaction goes into a "committed" state, the method further comprises the steps of:

recreation, by said restart process, of the process context associated with said client process;

recreation of said Recovery Service, associated with said client process;

determination of the outcome of any in-doubt transactions using data from said log file;

for each of said in-doubt transactions having their outcome determined, executing commit or rollback operations on the participants corresponding to the outcome of the transactions.

2. A method as claimed in claim 1 wherein the recovery information is a list of all transactions which are in a "prepared" state and the last log record for each unfinished transaction.

3. A method as claimed in claim 1 wherein the restart information includes a file identifier in which the recovery information is located.

4. A method as claimed in claim 3 wherein restart information is stored for a plurality of client processes, the restart information including a unique identifier for each of said client processes.

5. A method as claimed in claim 3 wherein the restart information for a process includes an indication of whether restart should be attempted for that process.

6. A method as claimed in claim 3 wherein the restart information includes an indication of how many times restart should be attempted.

7. A method as claimed in claim 3 wherein the restart information includes the name of a program to restart as a surrogate to the client process.

8. A method as claimed in claim 3 wherein the restart information includes a file identifier for the log file for the client process.

9. A method as claimed in claim 1 wherein said monitoring is by means of a periodic check of the status of each of the client processes having entries in the Restart Repository.

10. A distributed OMG-compliant transaction system comprising:

a client process having a unique identifier;

means for executing a transaction, including:
   means for invocation of requests on processes running in a system remote from the client process;
   means for committing said transaction, causing said transaction to go into a "prepared" state;
a Recovery Service, associated with said client process, for logging of recovery information in a log file;

characterised in that the system further comprises:

a restart repository for the storage of restart information associated with the transaction;

wherein said means for executing a transaction further includes means for storing in said restart repository, restart information associated with the transaction, said restart information being stored after said transaction goes into a "prepared" state;

a restart process including:
   means for monitoring said client process and providing an indication if said client fails;
   means, responsive to said monitoring means, for recreating the process context associated with said client process;
   means, responsive to said monitoring means, for recreating said Recovery Service associated with said client process;
   means for determining the outcome of any in-doubt transactions using data from said log file; and
   means for executing commit or rollback operations on the participants in each of said in-doubt transactions having their outcome determined, corresponding to the outcome of the transactions.

11. A system as claimed in claim 10 wherein the recovery information is a list of all transactions which are in a "prepared" state and the last log record for each unfinished transaction.

12. A system as claimed in claim 10 wherein the restart information includes a file identifier in which the recovery information is located.

13. A system as claimed in claim 10 wherein said monitoring is by means of a periodic check of the status of each of the processes having entries in the Restart Repository.

* * * * *